(12) United States Patent
Masuda

(10) Patent No.: US 6,832,840 B2
(45) Date of Patent: Dec. 21, 2004

(54) DISPLAY DEVICE

(75) Inventor: Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 10/387,836

(22) Filed: Mar. 14, 2003

(65) Prior Publication Data

US 2003/0179563 A1 Sep. 25, 2003

(30) Foreign Application Priority Data

Mar. 25, 2002 (JP) ........................................ 2002-083747

(51) Int. Cl.[7] ................................................ F21V 9/14
(52) U.S. Cl. ........................... 362/19; 362/31; 362/330; 362/561
(58) Field of Search ............................. 362/19, 26, 31, 362/559, 561, 330; 349/62, 63, 96, 137; 359/577, 586

(56) References Cited

U.S. PATENT DOCUMENTS

| | | |
|---|---|---|
| 6,108,059 A | 8/2000 | Yang |
| 6,266,108 B1 | 7/2001 | Bao et al. |
| 6,323,919 B1 * | 11/2001 | Yang et al. .................... 349/63 |
| 6,340,999 B1 | 1/2002 | Masuda et al. |

FOREIGN PATENT DOCUMENTS

| | | |
|---|---|---|
| EP | 0 957 392 A1 | 11/1999 |
| JP | 11-149252 A | 6/1999 |
| JP | 11-219610 A | 8/1999 |
| JP | 11-339528 A | 12/1999 |
| JP | 2000-221501 A | 8/2000 |

OTHER PUBLICATIONS

Tanaka, "Latest Technique for Backlight, Technical Behavior of Front Light", Monthly Display, Nov. 2001, pp. 56–62 and partial English translation.
Manual of Optical Thin Film Technology, pp. 276–283.

* cited by examiner

*Primary Examiner*—Alan Cariaso
*Assistant Examiner*—Mark Tsidulko
(74) *Attorney, Agent, or Firm*—Nixon & Vanderhye, P.C.

(57) ABSTRACT

A display device of the present invention includes a light source 111, a light guide 113 having a light-receiving surface 113a for receiving light from the light source 111 and a light-exiting surface 113c for emitting the light, which has entered the light guide 113 through the light-receiving surface 113a, a reflection type display element 120 provided on one side of the light guide 113 that is closer to the light-exiting surface 113c, and a refractive-index-adjusted layer 131 provided between the light guide 113 and the reflection type display element 120 and having a different refractive index from that of the light guide 113. The light guide 113 and the reflection type display element 120 are attached to each other via the refractive-index-adjusted layer 131, and at least one of the interface between the light guide 113 and the refractive-index-adjusted layer 131 and the interface between the refractive-index-adjusted layer 131 and the reflection type display element 120 is subjected to an anti-interface-reflection treatment for suppressing the reflection of light at the interface.

8 Claims, 9 Drawing Sheets

DISPLAY DEVICE

BACKGROUND OF THE INVENTION

1. Field of the Invention

The present invention relates to a display device, and more particularly to a display device having a front light.

2. Description of the Background Art

In recent years, liquid crystal display devices, having desirable characteristics such as a small thickness and a small power consumption, have been widely used in various applications, including OA equipment such as word processors and personal computers, PDAs (personal digital assistance) such as electronic organizers, and camcorders with liquid crystal monitors.

Unlike a self-luminous display device such as a CRT (Cathode Ray Tube), a PDP (Plasma Display Panel) and an EL (Electro Luminescence) device, a non-luminous type display device such as a liquid crystal display device does not emit light by itself, and displays characters and images by controlling the amount of externally-provided light to be transmitted or reflected.

These liquid crystal display devices are generally classified into those of transmission type and those of reflection type.

A transmission type liquid crystal display device displays an image by modulating light from an illuminator (so-called "backlight") arranged on the rear side of a liquid crystal display element through a liquid crystal layer of the liquid crystal display element.

On the other hand, a reflection type liquid crystal display device displays an image by using ambient light, and thus does not require a backlight. Therefore, a reflection type liquid crystal display device has a number of advantages such as a small weight, a small thickness, and a low power consumption. Moreover, the visibility does not lower even under very bright environments, and a displayed image can be viewed more clearly under bright environments. However, with a reflection type liquid crystal display device, the display brightness and the contrast ratio are substantially influenced by the conditions under which it is used, e.g., the brightness of the environment. Particularly, the visibility lowers significantly under dark environments.

Therefore, some reflection type liquid crystal display devices are provided with an illuminator for improving the display quality in cases where ambient light of a sufficient intensity is not available. The illuminator is provided on the front side of the liquid crystal display element, and is called "frontlight" as opposed to the illuminator of a transmission type liquid crystal display device being called "backlight".

FIG. 7 schematically illustrates a reflection type liquid crystal display device 600A, which is disclosed in "Monthly DISPLAY", November 2001 issue (Techno Times Co., Ltd.), p. 56 to p. 62, "Frontlight Technical Trend".

As illustrated in FIG. 7, the reflection type liquid crystal display device 600A includes a reflection type liquid crystal display element 620, and a front light 610 provided on the viewer side of the reflection type liquid crystal display element 620.

The front light 610 includes a light source 611 and a light guide 613, and a reflection film 612 is provided so as to surround the light source 611.

The light guide 613 includes a light-receiving surface 613a for receiving light from the light source 611, a light-exiting surface 613b provided so as to be substantially perpendicular to the light-receiving surface 613a, and a counter surface 613c opposing the light-exiting surface 613b. The reflection type liquid crystal display element 620 is provided on one side of the light guide 613 that is closer to the light-exiting surface 613b. The counter surface 613c includes a propagation surface 613c1 and a reflection surface 613c2, and has a saw-toothed cross section.

Light emitted from the light source 611 enters the light guide 613 through the light-receiving surface 613a, and propagates therethrough while being totally reflected between the light-exiting surface 613b and the propagation surface 613c1. A portion of the light, which is being propagated through the light guide 613, is reflected by the reflection surface 613c2 and emitted toward the reflection type liquid crystal display element 620 through the light-exiting surface 613b.

The reflection type liquid crystal display element 620 includes a pair of glass substrates 621a and 621b, and a liquid crystal layer 622 and a reflector 623 provided between the pair of glass substrates 621a and 621b. A polarizer 624a and a λ/4 film 624b are provided on the glass substrate 621a on the viewer side (the side closer to the front light 610).

In the reflection type liquid crystal display device 600A, circularly-polarized light that has entered the liquid crystal layer 622 via the polarizer 624a and the λ/4 film 624b passes through the liquid crystal layer 622, is reflected by the reflector 623, and passes again through the liquid crystal layer 622. In this process, the amount of light is controlled as the polarization thereof is modulated by the liquid crystal layer 622, thereby displaying an image.

Anti-reflection films 631a and 631b are provided, through a vapor deposition process, on the light-exiting surface 613b of the light guide 613 and the polarizer 624a of the reflection type liquid crystal display element 620, respectively, for an anti-air-interface-reflection treatment. Therefore, the air-interface reflection is suppressed at the interface between the light-exiting surface 613b and the air, and at the interface between the polarizer 624a and the air, thereby suppressing a decrease in the contrast ratio due to light being reflected at the interfaces toward the viewer side.

Moreover, the article ("Monthly Display", November 2001 issue (Techno Times Co., Ltd.), p. 56 to p. 62, "Frontlight Technical Trend") also discloses a reflection type liquid crystal display device 600B illustrated in FIG. 8.

In the reflection type liquid crystal display device 600B, the polarizer 624a and the λ/4 film 624b are attached to the light-exiting surface 613b of the light guide 613 via the adhesive layer 631, as illustrated in FIG. 8, and light exiting through the light-exiting surface 613b of the light guide 613 passes through the polarizer 624a and the λ/4 film 624b via the adhesive layer 631 to become circularly-polarized light. The light reflected at the interface between the λ/4 film 624b and the air, and at the interface between the glass substrate 621a on the viewer side of the reflection type liquid crystal display element 620 and the air, passes again through the λ/4 film 624b and is then absorbed by the polarizer 624a, thereby suppressing a decrease in the contrast ratio due to the reflection of light at the interfaces.

Moreover, Japanese Laid-Open Patent Publication No. 11-149252 discloses a reflection type liquid crystal display device 600C in which the light guide 613 and the reflection type liquid crystal display element 620 are attached to each other via the adhesive layer 631, as illustrated in FIG. 9.

In the reflection type liquid crystal display device 600C, the light guide 613 and the reflection type liquid crystal display element 620 are attached to each other via an adhesive layer 632, as illustrated in FIG. 9, there is no air-element interface between the light guide 613 and the reflection type liquid crystal display element 620. Therefore, an unnecessary air-interface reflection does not occur, thereby realizing a display with a high contrast ratio.

However, an in-depth research by the present inventor has revealed that the reflection type liquid crystal display devices 600A, 600B and 600C have the following problems.

First, as illustrated in FIG. 7, with the anti-air-interface-reflection treatment using anti-reflection films, the air-interface reflection cannot be suppressed sufficiently. For example, in a case where an interference film made of a transparent material is formed as an anti-reflection film, the air-interface reflection can be reduced only to about 0.1 to 0.3% even if five or six interference films are laminated together. In view of this, in the reflection type liquid crystal display device 600A, the decrease in the contrast ratio cannot be suppressed sufficiently. Moreover, the anti-air-interface-reflection treatment as described above has some dependency on the wavelength of light, and cannot effectively reduce the air-interface reflection across the entire visible spectrum. Therefore, coloring of light may occur due to the air-interface reflection in a particular wavelength range, thereby lowering the display quality.

As illustrated in FIG. 8, the effect of suppressing the air-interface reflection obtained by attaching the polarizer 624a and the λ/4 film 624b on the light guide 613 is significantly greater than that obtained through the anti-air-interface-reflection treatment using anti-reflection films. Therefore, the reflection type liquid crystal display device 600B provides a significantly improved the contrast ratio. However, since the light-exiting surface 613b of the light guide 613 is adjacent to the adhesive layer 631, but not to the air layer, total reflection does not occur efficiently at the light-exiting surface 613b. Specifically, after the light, which is being propagated through the light guide 613, is reflected by the propagation surface 613c1 and reaches the light-exiting surface 613b, the light is not totally reflected by the light-exiting surface 613b and a portion of the light enters the polarizer 624a via the adhesive layer 631, whereby the light is partially absorbed. Therefore, the amount of light propagating through the light guide 613 decreases, and the amount of light that is reflected by the reflection surface 613c2 of the counter surface 613c to be emitted through the light-exiting surface 613b also decreases, thereby lowering the display brightness.

In order to suppress the decrease in the brightness, Japanese Laid-Open Patent Publication No. 2000-155315 discloses a method in which the refractive index of the adhesive layer 631, which is provided between the light-exiting surface 613b of the light guide 613 and the polarizer 624a is set to be different from that of the light guide 613 (for example, the refractive index of the adhesive layer 631 is set to be smaller than that of the light guide 613), thereby causing total reflection to occur efficiently at the light-exiting surface 613b, and thus improving the brightness.

However, when the refractive index of the adhesive layer 631 is set to be different from that of the light guide 613, an interface reflection occurs at the interface between the light guide 613 and the adhesive layer 631 or at the interface between the adhesive layer 631 and the polarizer 624a due to the refractive index differences therebetween, thereby decreasing the contrast ratio. Thus, in the reflection type liquid crystal display device 600B, it is difficult to improve both the brightness and the contrast ratio, irrespective of the setting of the refractive index of the adhesive layer 631.

Also in the reflection type liquid crystal display device 600C illustrated in FIG. 9, since the light-exiting surface 613b of the light guide 613 is adjacent to the adhesive layer 632, but not to the air layer, total reflection does not occur efficiently at the light-exiting surface 613b, thereby decreasing the display brightness.

In order to suppress the decrease in the brightness, Japanese Laid-Open Patent Publication No. 11-219610, Japanese Laid-Open Patent Publication No. 11-326903 and Japanese Laid-Open Patent Publication No. 11-339528 disclose a method in which the refractive index of the adhesive layer 632, which is provided between the light-exiting surface 613b of the light guide 613 and the reflection type liquid crystal display element 620, is set to be different from that of the light guide 613 (for example, the refractive index of the adhesive layer 632 is set to be smaller than that of the light guide 613), thereby causing total reflection to occur efficiently at the light-exiting surface 613b, and thus improving the brightness.

However, when the refractive index of the adhesive layer 632 is set to be different from that of the light guide 613, an interface reflection occurs at the interface between the light guide 613 and the adhesive layer 632 or at the interface between the adhesive layer 632 and the reflection type liquid crystal display element 620 due to the refractive index differences therebetween, thereby decreasing the contrast ratio. Thus, in the reflection type liquid crystal display device 600C, it is difficult to improve both the brightness and the contrast ratio, irrespective of the setting of the refractive index of the adhesive layer 632.

As described above, a display device providing both a desirable brightness and a desirable contrast ratio has not yet been realized in the art.

The present invention has been made in view of the problems as set forth above, and has an object to provide a display device capable of displaying an image with a high brightness and a high contrast ratio.

SUMMARY OF THE INVENTION

A display device of the present invention includes: a light source; a light guide having a light-receiving surface for receiving light from the light source and a light-exiting surface for emitting the light, which has entered the light guide through the light-receiving surface; a reflection type display element provided on one side of the light guide that is closer to the light-exiting surface; and a refractive-index-adjusted layer provided between the light guide and the reflection type display element and having a different refractive index from that of the light guide, wherein: the light guide and the reflection type display element are attached to each other via the refractive-index-adjusted layer; and at least one of an interface between the light guide and the refractive-index-adjusted layer and an interface between the refractive-index-adjusted layer and the reflection type display element is subjected to an anti-interface-reflection treatment for suppressing a reflection of light at the interface. Thus, the object set forth above is achieved.

The anti-interface-reflection treatment may be performed by forming an interference film made of a transparent material between the light guide and the refractive-index-adjusted layer and/or between the refractive-index-adjusted layer and the reflection type display element.

It is preferred that the interface between the light guide and the refractive-index-adjusted layer and the interface between the refractive-index-adjusted layer and the reflection type display element are both subjected to the anti-interface-reflection treatment.

The refractive-index-adjusted layer may function as an adhesive layer for attaching the light guide and the reflection type display element to each other.

Another display device of the present invention includes: a light source; a light guide having a light-receiving surface for receiving light from the light source and a light-exiting surface for emitting the light, which has entered the light guide through the light-receiving surface; a reflection type display element provided on one side of the light guide that is closer to the light-exiting surface; a polarizer provided between the light guide and the reflection type display element; and a refractive-index-adjusted layer provided between the light guide and the polarizer and having a different refractive index from that of the light guide, wherein: the light guide and the polarizer are attached to each other via the refractive-index-adjusted layer; and at least one of an interface between the light guide and the refractive-index-adjusted layer and an interface between the refractive-index-adjusted layer and the polarizer is subjected to an anti-interface-reflection treatment for suppressing a reflection of light at the interface. Thus, the object set forth above is achieved.

The anti-interface-reflection treatment may be performed by forming an interference film made of a transparent material between the light guide and the refractive-index-adjusted layer and/or between the refractive-index-adjusted layer and the polarizer.

It is preferred that the interface between the light guide and the refractive-index-adjusted layer and the interface between the refractive-index-adjusted layer and the polarizer are both subjected to the anti-interface-reflection treatment.

The refractive-index-adjusted layer may function as an adhesive layer for attaching the light guide and the polarizer to each other.

It is preferred that the refractive index of the refractive-index-adjusted layer is smaller than that of the light guide.

It is preferred that a value of the refractive index of the refractive-index-adjusted layer is greater than 1 and less than or equal to 1.4.

The functions of the present invention will now be described.

In a display device of the present invention, the refractive-index-adjusted layer having a different refractive index from that of the light guide is provided between the light guide and the reflection type display element, whereby the total reflection of light occurs efficiently at the light-exiting surface of the light guide. Therefore, the decrease in the amount of light being propagated through the light guide is suppressed, thereby realizing a bright display. Moreover, at least one of the interface between the light guide and the refractive-index-adjusted layer and the interface between the refractive-index-adjusted layer and the reflection type display element is subjected to the anti-interface-reflection treatment for suppressing the reflection of light at the interfaces. Thus, the reflection of light is suppressed at the interfaces, thus realizing a display with a high contrast ratio.

For example, the anti-interface-reflection treatment is performed by forming an interference film made of a transparent material between the light guide and the refractive-index-adjusted layer and/or between the refractive-index-adjusted layer and the reflection type display element.

If the interface between the light guide and the refractive-index-adjusted layer and the interface between the refractive-index-adjusted layer and the reflection type display element are both subjected to the anti-interface-reflection treatment, it is possible to further improve the contrast ratio.

In another display device of the present invention, the refractive-index-adjusted layer having a different refractive index from that of the light guide is provided between the light guide and the polarizer, whereby the total reflection of light occurs efficiently at the light-exiting surface of the light guide. Therefore, the decrease in the amount of light being propagated through the light guide is suppressed, thereby realizing a bright display. Moreover, at least one of the interface between the light guide and the refractive-index-adjusted layer and the interface between the refractive-index-adjusted layer and the polarizer is subjected to the anti-interface-reflection treatment for suppressing the reflection of light at the interfaces. Thus, the reflection of light is suppressed at the interfaces, thus realizing a display with a high contrast ratio.

For example, the anti-interface-reflection treatment is performed by forming an interference film made of a transparent material between the light guide and the refractive-index-adjusted layer and/or between the refractive-index-adjusted layer and the polarizer.

If the interface between the light guide and the refractive-index-adjusted layer and the interface between the refractive-index-adjusted layer and the polarizer are both subjected to the anti-interface-reflection treatment it is possible to further improve the contrast ratio.

In order for the total reflection of light to occur efficiently at the light-exiting surface of the light guide, the refractive index of the refractive-index-adjusted layer is preferably smaller than that of the light guide. If the value of the refractive index of the refractive-index-adjusted layer is greater than 1 and less than or equal to 1.4, a sufficient brightness can be obtained.

The production of the display device is facilitated if the refractive-index-adjusted layer functions also as an adhesive layer for attaching the light guide and the reflection type display element to each other, or the light guide and the polarizer to each other.

The present invention provides a display device capable of displaying an image with a high brightness and a high contrast ratio.

In a display device of the present invention, the refractive-index-adjusted layer having a different refractive index from that of the light guide is provided between the light guide and the reflection type display element, whereby the total reflection of light occurs efficiently at the light-exiting surface of the light guide. Therefore, the decrease in the amount of light being propagated through the light guide is suppressed, thereby realizing a bright display. Moreover, at least one of the interface between the light guide and the refractive-index-adjusted layer and the interface between the refractive-index-adjusted layer and the reflection type display element is subjected to the anti-interface-reflection treatment for suppressing the reflection of light at the interfaces. Thus, the reflection of light is suppressed at the interfaces, thus realizing a display with a high contrast ratio.

In another display device of the present invention, the refractive-index-adjusted layer having a different refractive index from that of the light guide is provided between the light guide and the polarizer, whereby the total reflection of light occurs efficiently at the light-exiting surface of the light guide. Therefore, the decrease in the amount of light being propagated through the light guide is suppressed, thereby realizing a bright display. Moreover, at least one of the interface between the light guide and the refractive-index-adjusted layer and the interface between the refractive-index-adjusted layer and the polarizer is subjected to the anti-interface-reflection treatment for suppressing the reflection of light at the interfaces. Thus, the reflection of light is suppressed at the interfaces, thus realizing a display with a high contrast ratio.

DETAILED DESCRIPTION OF THE PREFERRED EMBODIMENTS

Display devices (image display devices) according to preferred embodiments of the present invention will now be described with reference to the drawings. Note that the present invention is not limited to the following embodiments.

Embodiment 1

Figure 1:
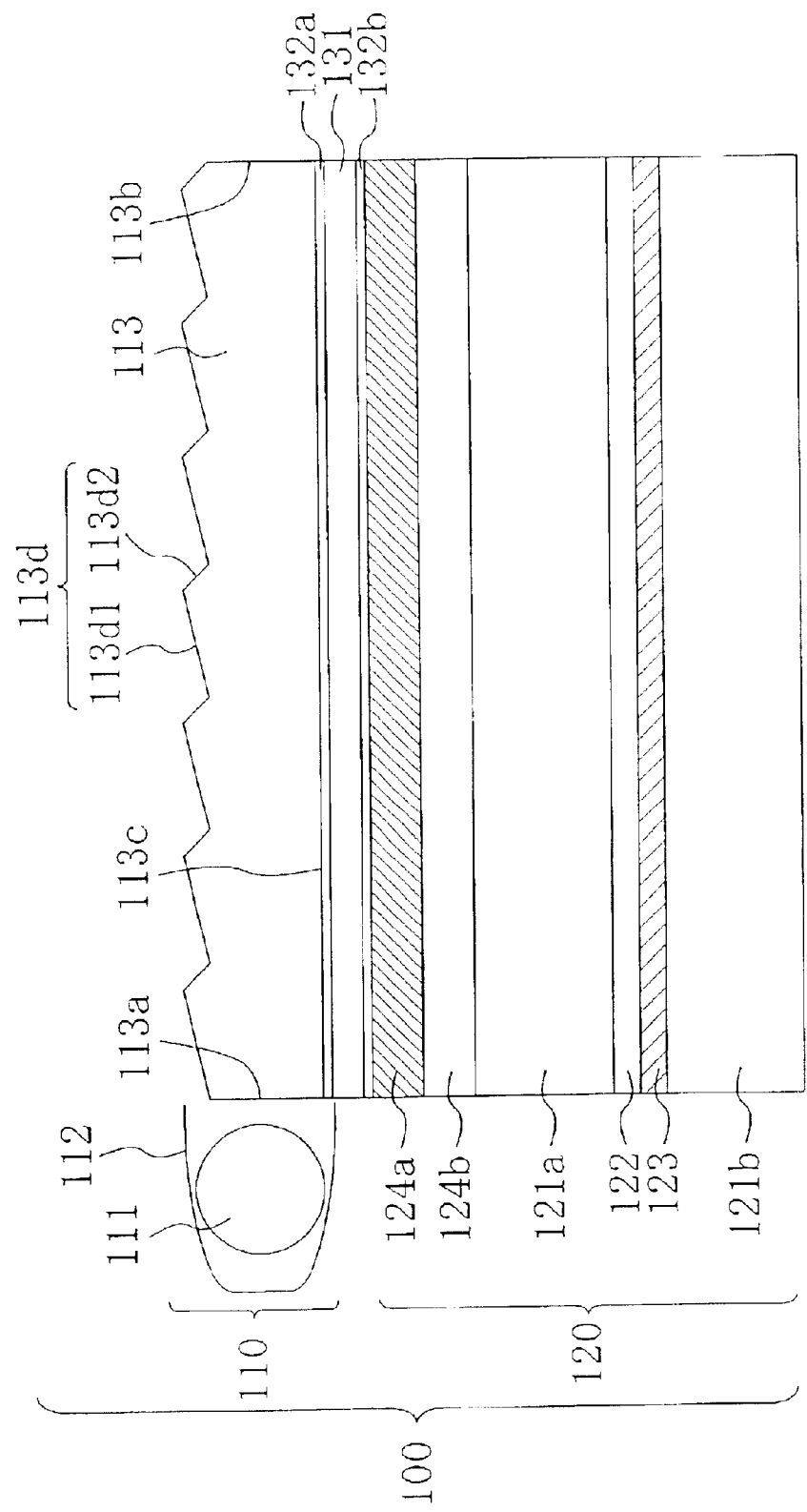
FIG. 1 is a cross-sectional view schematically illustrating a display device 100 according to Embodiment 1 of the present invention.

FIG. 1 is a schematic cross-sectional view illustrating a display device 100 according to Embodiment 1 of the present invention.

The display device 100 is a reflection type liquid crystal display device including a reflection type liquid crystal display element 120, and an illuminator (front light) 110 provided on the viewer side of the reflection type liquid crystal display element 120.

The reflection type liquid crystal display element 120 includes a pair of substrates (e.g., glass substrates) 121a and 121b, and a liquid crystal layer 122 provided therebetween. A λ/4 film 124b and a polarizer (e.g., a polarizing plate or a polarizing film) 124a are provided in this order on the viewer side surface of a substrate 121a, which is provided on the viewer side (the side closer to the illuminator 110). Moreover, a reflection electrode 123 is provided on one side of a substrate 121b, which is provided on the back side (opposite to the viewer side), that is closer to the liquid crystal layer 122.

The illuminator 110 includes a light source 111 and a light guide 113. The light source 111 may be any of various light emitting devices such as a cathode ray tube, an LED (light emitting diode), and an EL device. A reflective element (e.g., a reflection film) 112 is provided so as to surround the light source 111, whereby light emitted from the light source 111 efficiently enters the light guide 113.

The light guide 113 includes a light-receiving surface (a first side surface) 113a for receiving light from the light source 111, a second side surface 113b opposing the light-receiving surface 113a, a third side surface and a fourth side surface (not shown) provided between the light-receiving surface 113a and the second side surface 113b so as to oppose each other, a light-exiting surface 113c provided on the side closer to the reflection type liquid crystal display element 120, and a prism surface 113d opposing the light-exiting surface 113c. Herein, the light-exiting surface 113c is arranged so as to be substantially perpendicular to the light-receiving surface 113a. The prism surface 113d includes a propagation surface 113d1 and a reflection surface 113d2, and has a saw-toothed cross section. In the present embodiment, the light guide 113 is a light guide having a refractive index of 1.49 that is formed by injection molding of polymethyl methacrylate.

A refractive-index-adjusted layer 131 having a different refractive index from that of the light guide 113 is provided between the light guide 113 of the illuminator 110 and a reflection type display element 120 (between the light-exiting surface 113c of the light guide 113 and the polarizer 124a), and the light guide 113 and the reflection type display element 120 are attached to each other via the refractive-index-adjusted layer 131. In the present embodiment, the refractive-index-adjusted layer 131 functions also as an adhesive layer for attaching the light guide 113 and the reflection type display element 120 to each other.

Typically, the refractive index of the refractive-index-adjusted layer 131 is set to be smaller than that of the light guide 113, and the refractive-index-adjusted layer 131 functions as a low-refractive-index layer. In the present embodiment, the refractive-index-adjusted layer 131 is formed by curing a UV-curable resin (e.g., Defenser 7702AZ-70 manufactured by Dainippon Ink And Chemicals, Inc.), and the refractive index thereof is 1.38.

The interface between the light guide 113 and the refractive-index-adjusted layer 131 (more specifically, the interface between the light-exiting surface 113c of the light guide 113 and the refractive-index-adjusted layer 131), and the interface between the refractive-index-adjusted layer 131 and the reflection type display element 120 (more specifically, the interface between the refractive-indexadjusted layer 131 and the polarizer 124a), are both subjected to an anti-interface-reflection treatment for suppressing the reflection of light at the interfaces.

Specifically, the anti-interface-reflection treatment is performed by forming interference films 132a and 132b, which are made of a transparent material, between the light guide 113 and the refractive-index-adjusted layer 131 (between the light-exiting surface 113c and the refractive-index-adjusted layer 131) and between the refractive-index-adjusted layer 131 and the reflection type display element 120 (between the refractive-index-adjusted layer 131 and the polarizer 124a), respectively. The interference films 132a and 132b suppress the interface reflection by utilizing the interference phenomenon of visible light.

In the present embodiment, $SiO_2$, which is a dielectric material, is vapor-deposited on the light-exiting surface 113c of the light guide 113 to form the interference film 132a having a thickness of 90 nm and a refractive index of 1.46. Moreover, $SiO_2$ is vapor-deposited on the surface of the polarizer 124a, thereby forming the interference film 132b having a thickness of 90 nm and a refractive index of 1.46.

Light, which has been emitted from the light source 111 and entered the light guide 113 through the light-receiving surface 113a, is propagated toward the second side surface 113b while being totally reflected between the propagation surface 113d1 and the light-exiting surface 113c. A portion of the light, which is being propagated through the light guide 113, is reflected by the reflection surface 113d2 and emitted toward the reflection type liquid crystal display element 120 through the light-exiting surface 113c.

Light emitted toward the reflection type liquid crystal display element 120 then enters the reflection type liquid crystal display element 120 via the interference film 132a, the refractive-index-adjusted layer 131 and the interference film 132b.

The light is reflected by the reflection type liquid crystal display element 120, re-enters the light guide 113 through the light-exiting surface 113c via the interference film 132b, the refractive-index-adjusted layer 131 and the interference film 132a, passes through the light guide 113, and is then emitted toward the viewer side through the prism surface 113d to display an image.

In the display device 100 of Embodiment 1 of the present invention, the refractive-index-adjusted layer 131 having a different refractive index from that of the light guide 113 is provided between the light guide 113 and the reflection type display element 120, whereby the total reflection of light occurs efficiently at the light-exiting surface 113c of the light guide 113. Therefore, the decrease in the amount of light being propagated through the light guide 113 is suppressed, thereby realizing a bright display.

While the refractive-index-adjusted layer 131 is made of a UV-curable resin having a refractive index of 1.38 in the present embodiment, the material and the value of the refractive index of the refractive-index-adjusted layer 131 are not limited thereto.

The material of the refractive-index-adjusted layer 131 may be any suitable material as long as it is a transparent material having a different refractive index from that of the light guide, and is preferably a low-refractive-index resin such as a fluorocarbon resin. Moreover, the refractive-index-adjusted layer 131 may alternatively be formed through vapor deposition of a dielectric material having a refractive index of 1.4 or less, such as $MgF_2$.

Figure 2:
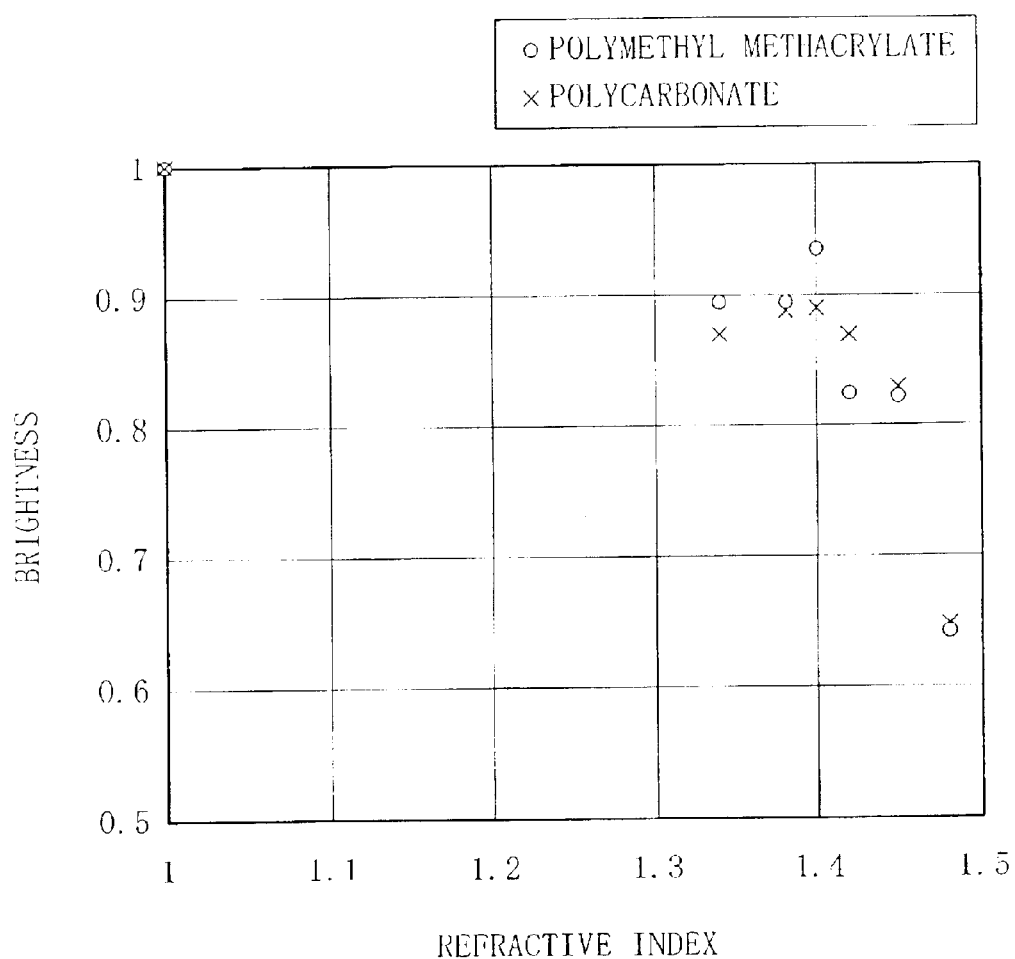
FIG. 2 is a graph illustrating the relationship between the refractive index of a refractive-index-adjusted layer and the brightness of the display device 100 in a case where a light guide is made of polymethyl methacrylate (refractive index: 1.49), and that in a case where it is made of polycarbonate (refractive index: 1.59).
Figure 6:
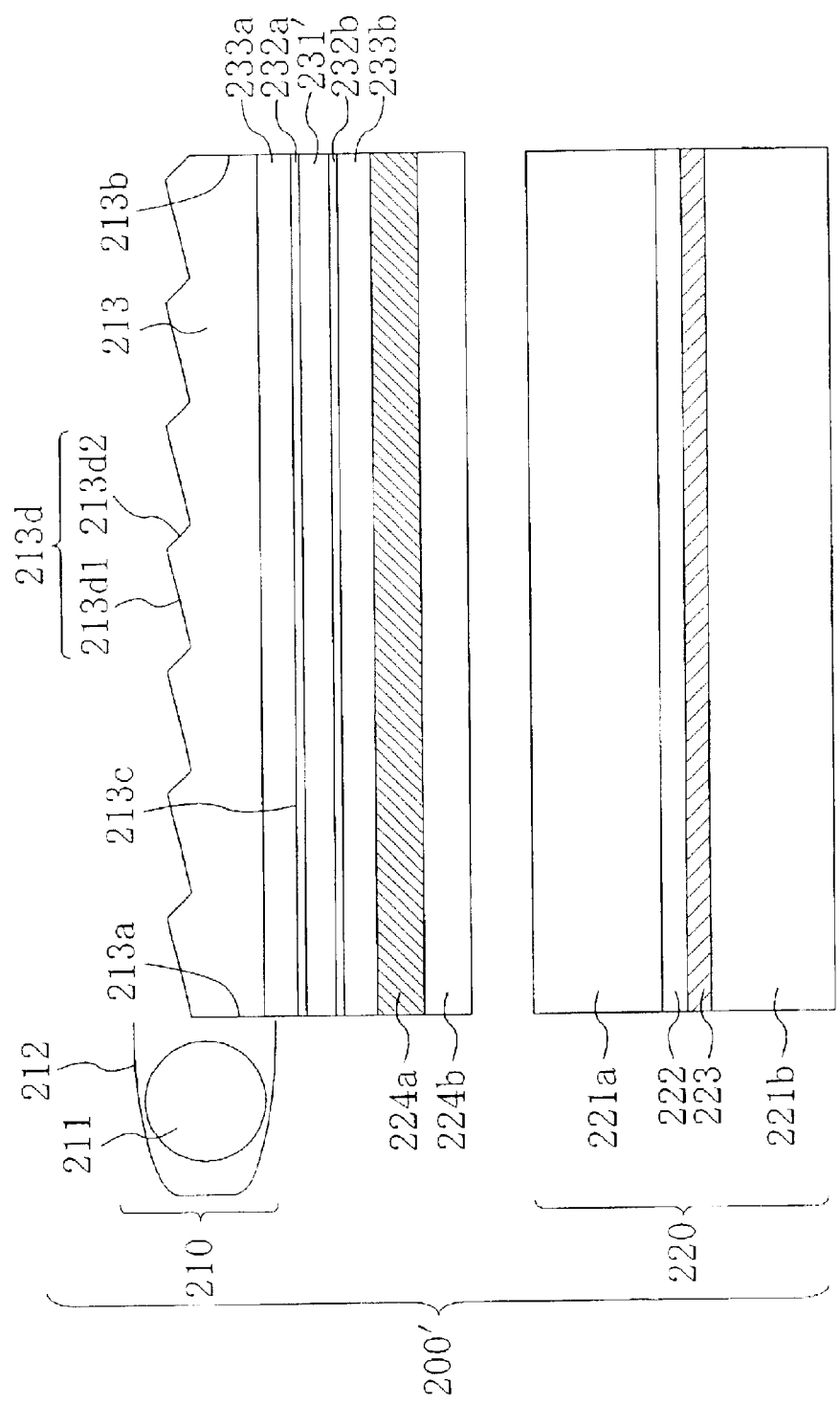
FIG. 6 is a cross-sectional view schematically illustrating an alternative display device 200' according to Embodiment 2 of the present invention.

Moreover, the value of the refractive index of the refractive-index-adjusted layer 131 is preferably greater than 1 and less than or equal to 1.4. FIG. 2 illustrates the relationship between the refractive index of the refractive-index-adjusted layer 131 and the brightness of the display device 100 in a case where the light guide 113 is made of polymethyl methacrylate (refractive index: 1.49), and that in a case where it is made of polycarbonate (refractive index: 1.59). Note that the brightness of the display device 100 is normalized with respect to the brightness of the conventional display device 600A (see FIG. 6), in which the light-exiting surface of the light guide forms an interface with the air (refractive index: 1.00).

As illustrated in FIG. 2, the brightness of the display device 100 changes substantially across a boundary at a refractive index of 1.4. If the refractive index is 1.4 or less, a brightness that is about 90% or more of that of the conventional display device 600 is realized. Thus, a sufficiently bright display is realized if the value of the refractive index of the refractive-index-adjusted layer 131 is greater than 1 and less than or equal to 1.4.

Moreover, in the display device 100 of Embodiment 1 of the present invention, the interface between the light guide 113 and the refractive-index-adjusted layer 131, and the interface between the refractive-index-adjusted layer 131 and the reflection type display element 120, are subjected to an anti-interface-reflection treatment for suppressing the reflection of light at the interfaces, thereby suppressing the reflection of light at the interfaces and thus realizing a display with a high contrast ratio.

The anti-interface-reflection treatment is performed by forming an interference film made of a transparent material, for example. An interference film made of a transparent material is formed through vapor deposition of a dielectric material, for example, as in the present embodiment. A single-layer interference film is formed in the present embodiment, a multi-layer interference film made up of two or more layers may alternatively be formed. The single-layer or multi-layer interference film may be formed by a known method with the refractive indices of the light guide 113, the reflection type liquid crystal display element 120, the polarizer 124a and the refractive-index-adjusted layer 131 being the parameters, e.g., a method described in "Manual for Optical and Thin-Film Formation Technology, revised and enlarged edition" (The Optronics Co., Ltd.), p. 276 to p. 283.

The effect of the anti-interface-reflection treatment will now be described in greater detail with reference to FIG. 3.

Figure 3:
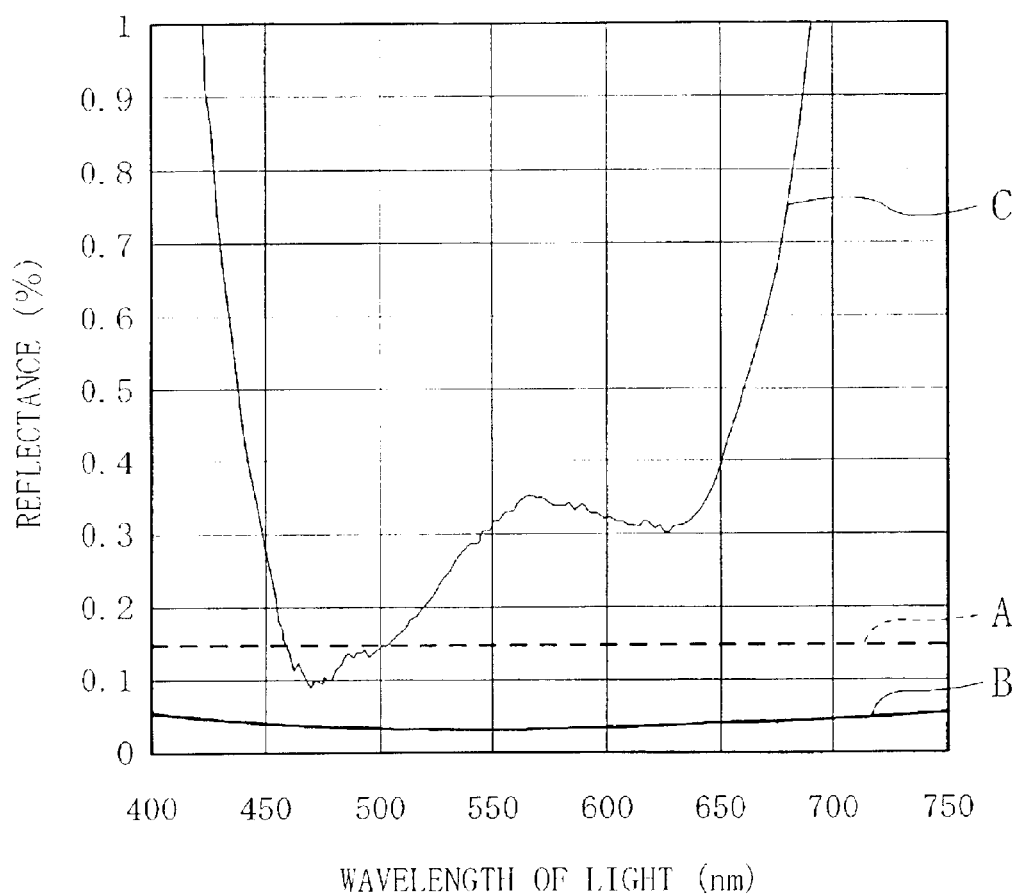
FIG. 3 is a graph illustrating the relationship between the wavelength (nm) of light and the reflectance (%) in a case where the interface between a light guide (refractive index: 1.49) and a refractive-index-adjusted layer (refractive index: 1.38) is not subjected to an anti-interface-reflection treatment, that in a case where the interface between the light guide and the refractive-index-adjusted layer is subjected to the anti-interface-reflection treatment, and that in a case where the interface between the light guide and the air layer is subjected to the anti-air-interface-reflection treatment.

The reflectance at the interface between a light guide made of polymethyl methacrylate having a refractive index of 1.49 and a refractive-index-adjusted layer having a refractive index of 1.38 is about 0.15% as indicated by broken line A in FIG. 3. In contrast, if an interference film made of $SiO_2$ and having a refractive index of 1.46 and a thickness of 90 nm is formed between these elements, i.e., between the light guide (refractive index: 1.49) made of polymethyl methacrylate and the refractive-index-adjusted layer (refractive index: 1.38), the interface reflection of visible light can be reduced to be 0.03 to 0.06%, as indicated by solid line B in FIG. 3. Therefore, the display device 100 of the present invention is capable of displaying an image with a higher contrast ratio as compared with the conventional reflection type liquid crystal display devices 600A and 600B illustrated in FIG. 7 and FIG. 8, respectively.

Figure 7:
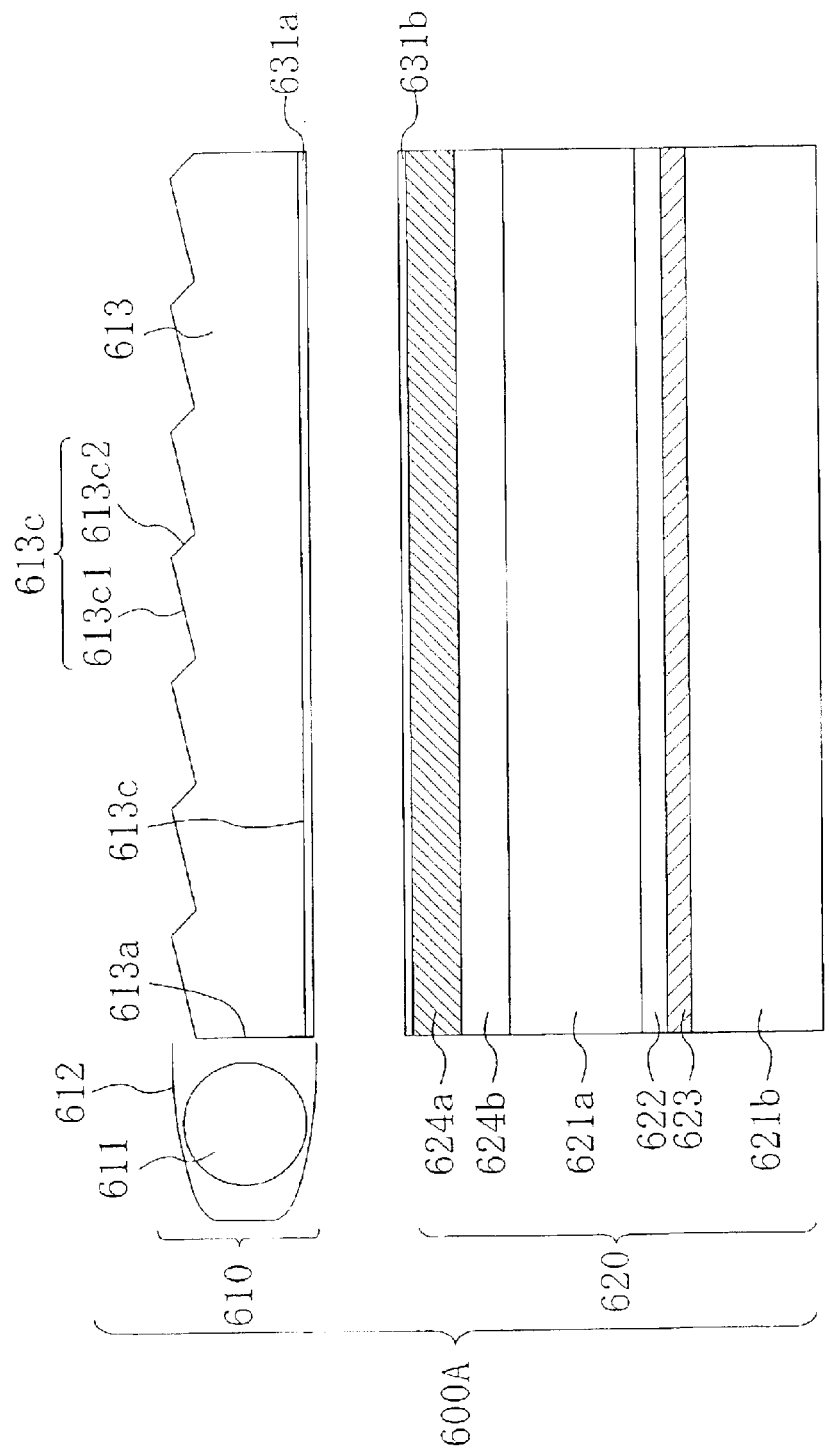
FIG. 7 is a cross-sectional view schematically illustrating a conventional reflection type liquid crystal display device 600A.
Figure 8:
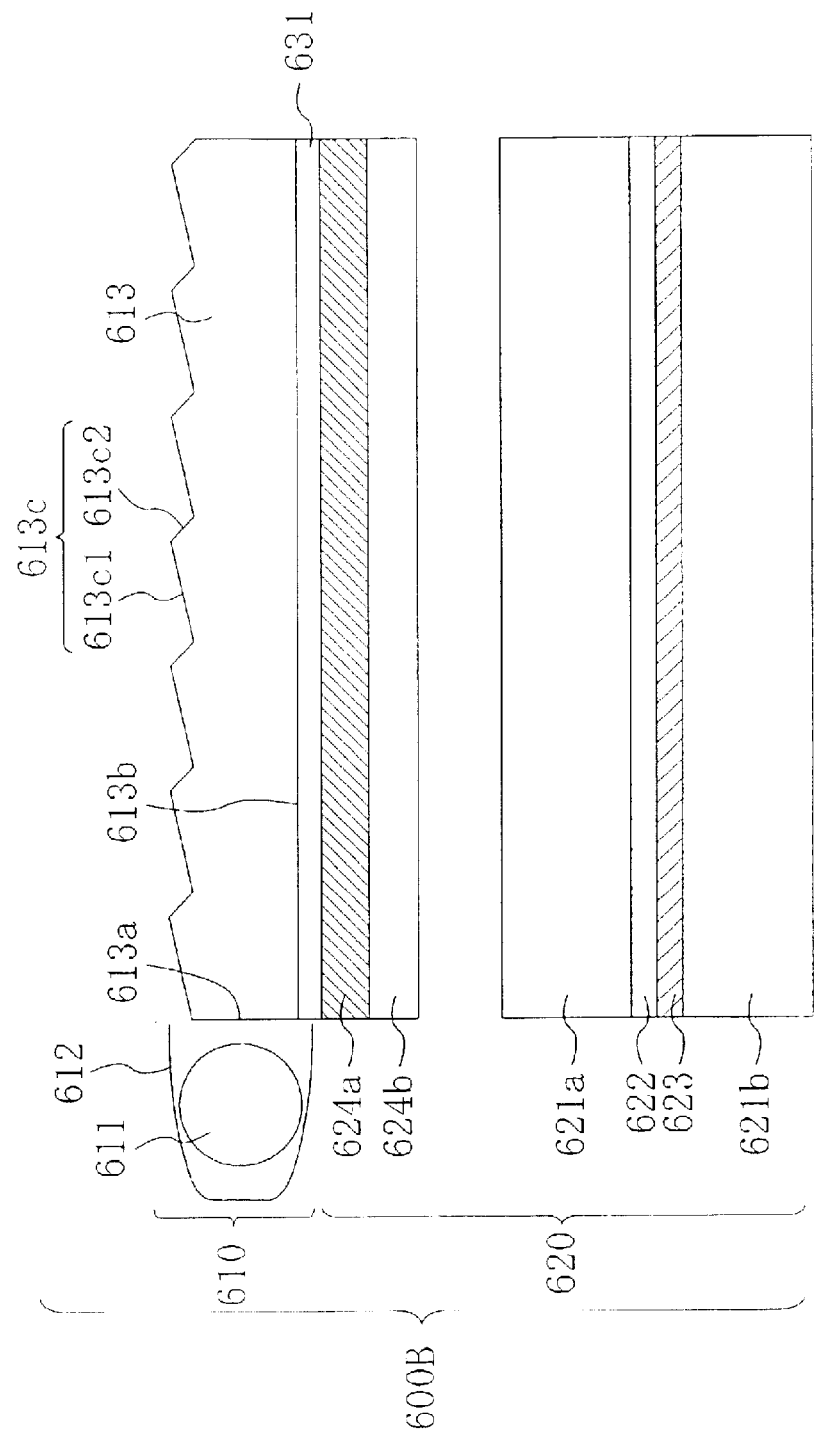
FIG. 8 is a cross-sectional view schematically illustrating a conventional reflection type liquid crystal display device 600B.

Moreover, in the conventional reflection type liquid crystal display device 600A illustrated in FIG. 7, even if five or six layers of interference film are laminated together between the light guide 613 and the air layer as an anti-air-interface-reflection treatment, the reflectance at the interface is about 0.1 to 0.3% as indicated by solid line C in FIG. 3, and the reflectance exhibits some wavelength dependence, thereby causing coloring of light. In contrast, when the anti-interface-reflection treatment is performed by forming a single-layer $SiO_2$ film between the light guide 113 and the refractive-index-adjusted layer 131, as in the present embodiment, there is provided a great effect of suppressing the interface reflection as indicated by solid line B in FIG. 3, and it is possible to suppress the interface reflection across the entire visible spectrum, thereby also suppressing the occurrence of coloring of light. Thus, it is possible to realize a display with a high contrast ratio and a high display quality.

While the anti-interface-reflection treatment of the present invention has been described with respect to the interface between the light guide 113 and the refractive-index-adjusted layer 131, it is needless to say that the interface reflection can be suppressed substantially by the anti-interface-reflection treatment also at the interface between the refractive-index-adjusted layer 131 and the reflection type liquid crystal display element 120.

As described above, the display device 100 of the present invention is capable of realizing a display with a high brightness and a high contrast ratio. Table 1 below shows the brightness and the contrast ratio for each of the display device 100 of Embodiment 1, the conventional reflection type liquid crystal display device 600A as Comparative Example 1, the conventional reflection type liquid crystal display device 600C (where the refractive index of the adhesive layer 631 is 1.38) as Comparative Example 2, and the conventional reflection type liquid crystal display device 600C (where the refractive index of the adhesive layer 631 is 1.48) as Comparative Example 3.

TABLE 1

|  | Embodiment 1 | Comparative Example 1 | Comparative Example 2 | Comparative Example 3 |
| --- | --- | --- | --- | --- |
| Brightness | 0.9 | 1.0 | 0.9 | 0.65 |
| Contrast ratio | 20 | 9 | 12 | 20 |

As can be seen from Table 1, in Comparative Example 1, Comparative Example 2 and Comparative Example 3, either the brightness or the contrast ratio is insufficient. In contrast, the display device 100 of Embodiment 1 realizes a display with a sufficient brightness and a high contrast ratio.

Note that while the interface between the light guide 113 and the refractive-index-adjusted layer 131, and the interface between the refractive-index-adjusted layer 131 and the reflection type display element 120, are both subjected to an anti-interface-reflection treatment in the present embodiment, the anti-interface-reflection treatment may alternatively be performed only for one of the interfaces. If the interface between the light guide 113 and the refractive-index-adjusted layer 131, and the interface between the refractive-index-adjusted layer 131 and the reflection type display element 120, are both subjected to an anti-interface-reflection treatment, as in the present embodiment, it is possible to further improve the contrast ratio.

Moreover, while the present embodiment has been described with respect to a case where the reflection type display element 120 includes the polarizer 124a, various types of reflection type liquid crystal display elements may of course be used, including a reflection type liquid crystal display element that includes no polarizer.

Embodiment 2

Figure 4:
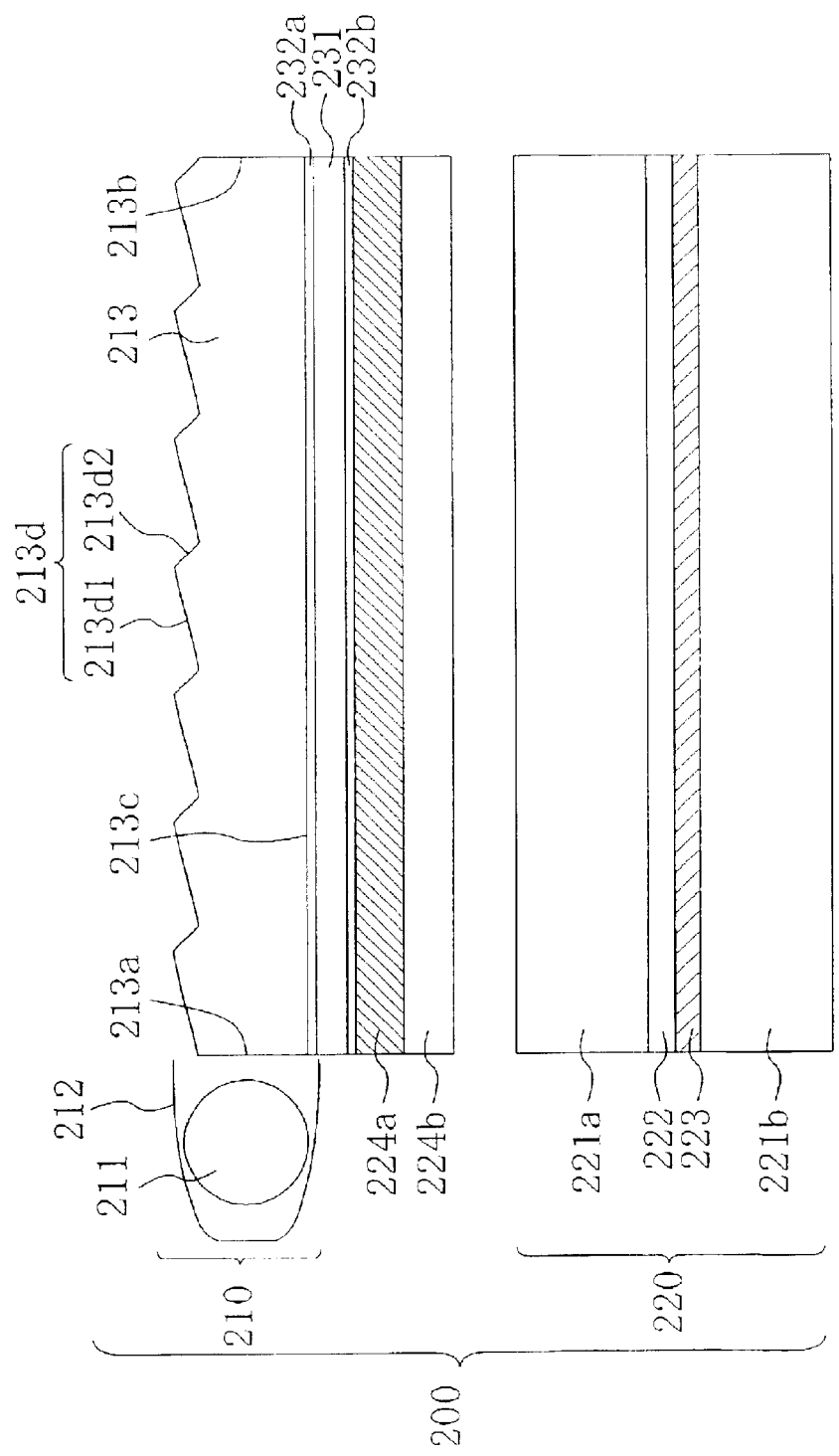
FIG. 4 is a cross-sectional view schematically illustrating a display device 200 of Embodiment 2 of the present invention.

FIG. 4 is a schematic cross-sectional view illustrating a display device 200 of Embodiment 2 of the present invention.

The display device 200 is a reflection type liquid crystal display device including a reflection type liquid crystal display element 220 and an illuminator (frontlight) 210 provided on the viewer side of the reflection type liquid crystal display element 220.

The reflection type liquid crystal display element 220 includes a pair of substrates (e.g., glass substrates) 221a and 221b, and a liquid crystal layer 222 provided therebetween. A reflection electrode 223 is provided on one side of the substrate 221b, which is provided on the back side (opposite to the viewer side), that is closer to the liquid crystal layer 222.

An illuminator 210 includes a light source 211 and a light guide 213. The light source 211 may be any of various light emitting devices such as a cathode ray tube, an LED (light emitting diode), and an EL device. A reflective element (e.g., a reflection film) 212 is provided so as to surround the light source 211, whereby light emitted from the light source 211 efficiently enters the light guide 213.

The light guide 213 includes a light-receiving surface (a first side surface) 213a for receiving light from the light source 211, a second side surface 213b opposing the light-receiving surface 213a, a third side surface and a fourth side surface (not shown) provided between the light-receiving surface 213a and the second side surface 213b so as to oppose each other, a light-exiting surface 213c provided on the side closer to the reflection type liquid crystal display element 220, a prism surface 213d opposing the light-exiting surface 213c. Herein, the light-exiting surface 213c is arranged so as to be substantially perpendicular to the light-receiving surface 213a. The prism surface 213d includes a propagation surface 213d1 and a reflection surface 213d2, and has a saw-toothed cross section. In the present embodiment, the light guide 213 is a light guide having a refractive index of 1.59 that is formed by injection molding of polycarbonate.

A polarizer (e.g., a polarizing plate or a polarizing film) 224a and a λ/4 film 224b are provided between the light guide 213 and the reflection type liquid crystal display element 220.

A refractive-index-adjusted layer 231 having a different refractive index from that of the light guide 213 is provided between the light guide 213 and the polarizer 224a, and the light guide 213 and the polarizer 224a are attached to each other via the refractive-index-adjusted layer 231. In the present embodiment, the refractive-index-adjusted layer 231 functions also as an adhesive layer for attaching the light guide 213 and the polarizer 224a to each other. The polarizer 224a and the λ/4 film 224b are spaced apart from the reflection type liquid crystal display element 220, as illustrated in FIG. 4.

Typically, the refractive index of the refractive-index-adjusted layer 231 is set to be smaller than that of the light guide 213, and the refractive-index-adjusted layer 231 functions as a low-refractive-index layer. In the present embodiment, the refractive-index-adjusted layer 231 is formed by curing a UV-curable resin (e.g., Defenser 7702AZ-70 manufactured by Dainippon Ink And Chemicals, Inc.), and the refractive index thereof is 1.38.

The interface between the light guide 213 and the refractive-index-adjusted layer 231 (more specifically, the interface between the light-exiting surface 213c of the light guide 213 and the refractive-index-adjusted layer 231), and the interface between the refractive-index-adjusted layer 231 and the polarizer 224a, are both subjected to an anti-interface-reflection treatment for suppressing the reflection of light at the interfaces.

Specifically, the anti-interface-reflection treatment is performed by forming interference films 232a and 232b, which are made of a transparent material, between the light guide 213 and the refractive-index-adjusted layer 231 (between the light-exiting surface 213c and the refractive-index-adjusted layer 231) and between the refractive-index-adjusted layer 231 and the polarizer 224a. The interference films 232a and 232b suppress the interface reflection by utilizing the interference phenomenon of visible light.

In the present embodiment, the interference film 232a having a thickness of 90 nm and a refractive index of 1.46 is formed through vapor deposition of $SiO_2$, which is a dielectric material, on the light-exiting surface 213c of the light guide 213. Moreover, the interference film 232b having a thickness of 90 nm and a refractive index of 1.46 is formed through vapor deposition of $SiO_2$ on the surface of the polarizer 224a.

Light, which has been emitted from the light source 211 and entered the light guide 213 through the light-receiving surface 213a, is propagated toward the second side surface 213b while being totally reflected between the propagation surface 213d1 and the light-exiting surface 213c. A portion of the light, which is being propagated through the light guide 213, is reflected by the reflection surface 213d2 and emitted toward the reflection type liquid crystal display element 220 through the light-exiting surface 213c.

Light emitted toward the reflection type liquid crystal display element 220 then enters the reflection type liquid crystal display element 220 via the interference film 232a, the refractive-index-adjusted layer 231, the interference film 232b, the polarizer 224a and the $\lambda/4$ film 224b.

The light is reflected by the reflection type liquid crystal display element 220, re-enters the light guide 213 through the light-exiting surface 213c via the $\lambda/4$ film 224b, the polarizer 224a, the interference film 232b, the refractive-index-adjusted layer 231 and the interference film 232a, passes through the light guide 213, and is then emitted toward the viewer side through the prism surface 213d to display an image.

In the display device 200 of Embodiment 2 of the present invention, the refractive-index-adjusted layer 231 having a different refractive index from that of the light guide 213 is provided between the light guide 213 and the polarizer 224a, whereby the total reflection of light occurs efficiently at the light-exiting surface 213c of the light guide 213. Therefore, the decrease in the amount of light being propagated through the light guide 213 is suppressed, thereby realizing a bright display.

Moreover, in the display device 200 of Embodiment 2 of the present invention, the interface between the light guide 213 and the refractive-index-adjusted layer 231, and the interface between the refractive-index-adjusted layer 231 and the polarizer 224a, are subjected to an anti-interface-reflection treatment for suppressing the reflection of light at the interfaces, thereby suppressing the reflection of light at the interfaces and thus realizing a display with a high contrast ratio.

The effect of the anti-interface-reflection treatment will now be described in greater detail with reference to FIG. 5.

Figure 5:
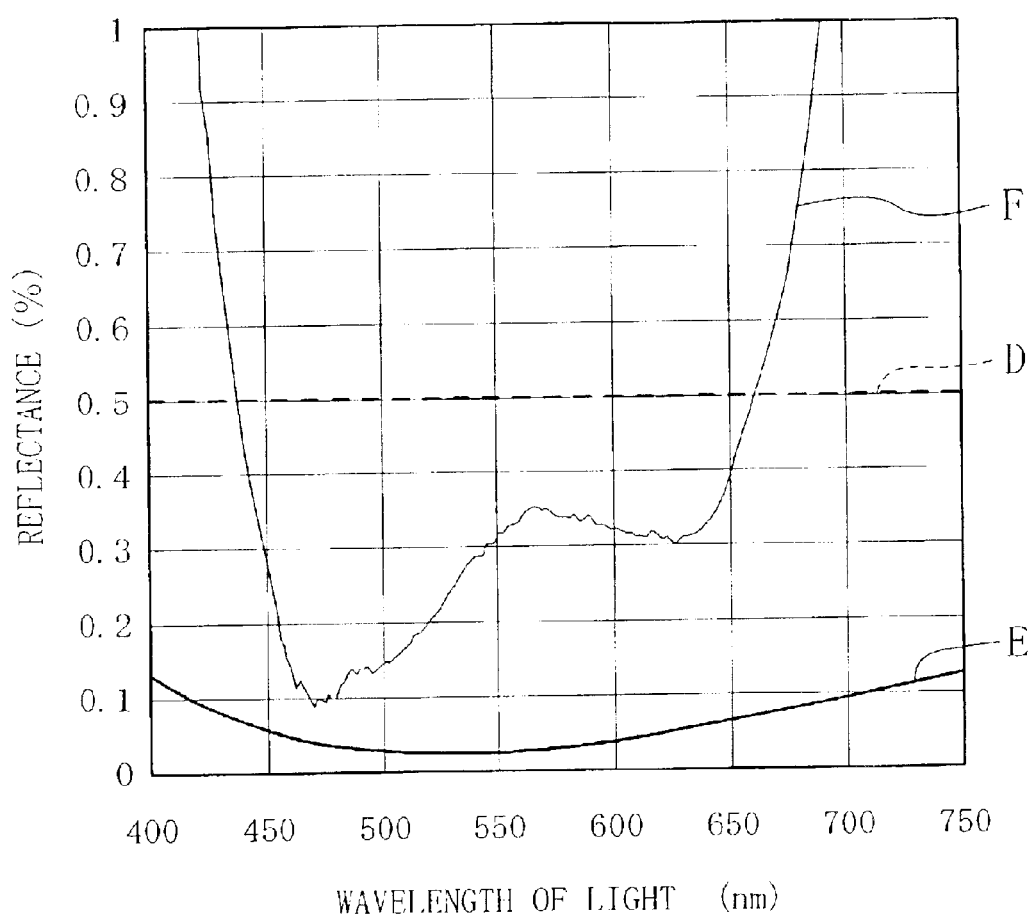
FIG. 5 is a graph illustrating the relationship between the wavelength (nm) of light and the reflectance (%) in a case where the interface between a light guide (refractive index: 1.59) and a refractive-index-adjusted layer (refractive index: 1.38) is not subjected to an anti-interface-reflection treatment, that in a case where the interface between the light guide and the refractive-index-adjusted layer is subjected to the anti-interface-reflection treatment, and that in a case where the interface between the light guide and the air layer is subjected to the anti-air-interface-reflection treatment.
Figure 9:
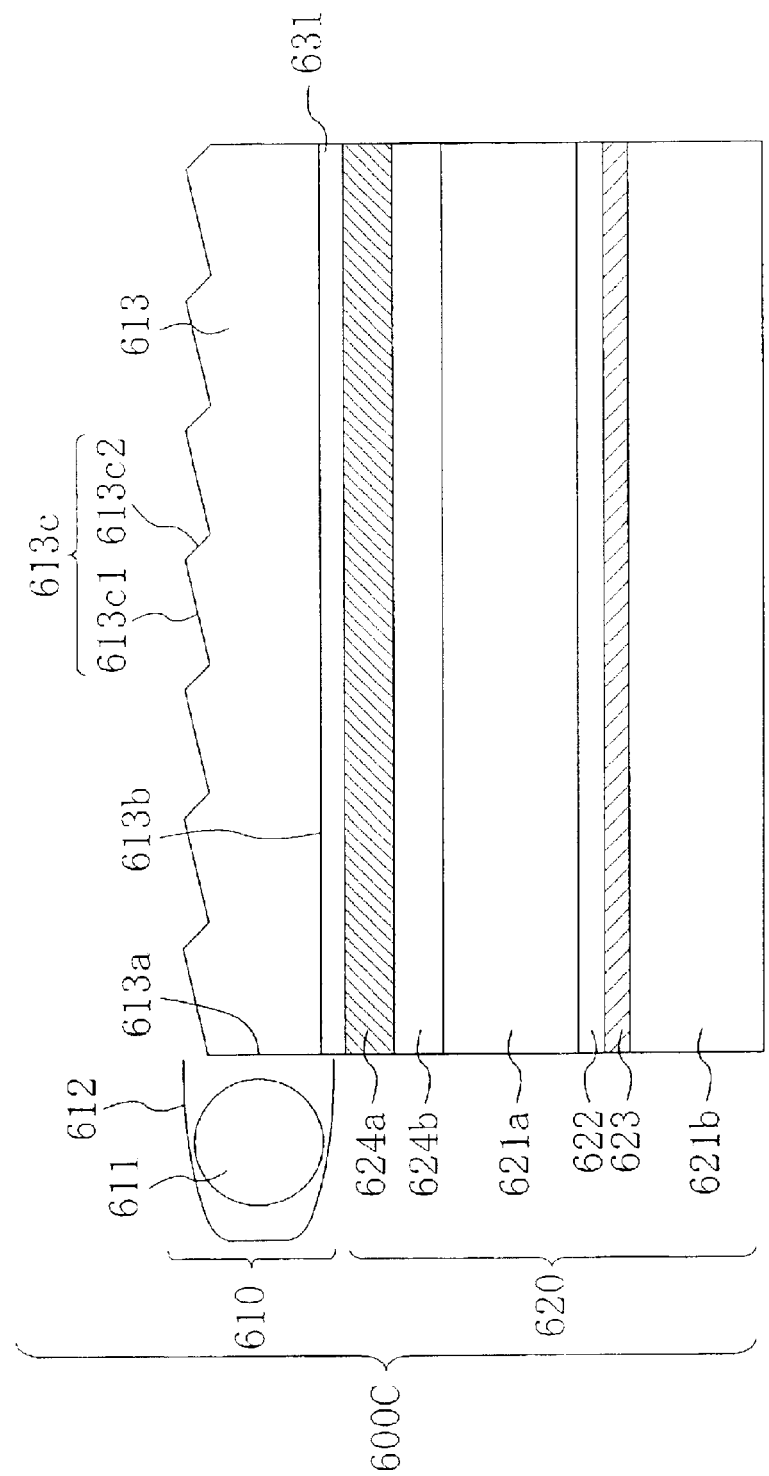
FIG. 9 is a cross-sectional view schematically illustrating a conventional reflection type liquid crystal display device 600C.

The reflectance at the interface between a light guide made of polycarbonate having a refractive index of 1.59 and a refractive-index-adjusted layer having a refractive index of 1.38 is about 0.50% as indicated by broken line D in FIG. 5. In contrast, if an interference film made of $SiO_2$ and having a refractive index of 1.46 and a thickness of 90 nm is formed between these elements, i.e., between the light guide (refractive index: 1.59) made of polycarbonate and the refractive-index-adjusted layer (refractive index: 1.38), the interface reflection of visible light can be reduced to be 0.02 to 0.13%, as indicated by solid line E in FIG. 5. Therefore, the display device 200 of the present invention is capable of displaying an image with a higher contrast ratio as compared with the conventional reflection type liquid crystal display devices 600B and 600C illustrated in FIG. 8 and FIG. 9, respectively.

Moreover, in the conventional reflection type liquid crystal display device 600A illustrated in FIG. 7, even if five or six layers of interference film are laminated together between the light guide 613 and the air layer as an anti-air-interface-reflection treatment, the reflectance at the interface is about 0.1 to 0.3% as indicated by solid line F in FIG. 5, and the reflectance exhibits some wavelength dependence, thereby causing coloring of light. In contrast, when the anti-interface-reflection treatment is performed by forming a single-layer $SiO_2$ film between the light guide 213 and the refractive-index-adjusted layer 231, as in the present embodiment, there is provided a great effect of suppressing the interface reflection as indicated by solid line E in FIG. 5, and it is possible to suppress the interface reflection across the entire visible spectrum, thereby also suppressing the occurrence of coloring of light. Thus, it is possible to realize a display with a high contrast ratio and a high display quality.

While the anti-interface-reflection treatment of the present invention has been described with respect to the interface between the light guide 213 and the refractive-index-adjusted layer 231, it is needless to say that the interface reflection can be suppressed substantially by the anti-interface-reflection treatment also at the interface between the refractive-index-adjusted layer 231 and the polarizer 224a.

As described above, the display device 200 of the present invention is capable of realizing a display with a high brightness and a high contrast ratio. Table 2 below shows the brightness and the contrast ratio for each of the display device 200 of Embodiment 2, the conventional reflection type liquid crystal display device 600A as Comparative Example 1, the conventional reflection type liquid crystal display device 600B (where the refractive index of the adhesive layer 631 is 1.38) as Comparative Example 4, and the conventional reflection type liquid crystal display device 600B (where the refractive index of the adhesive layer 631 is 1.48) as Comparative Example 5.

TABLE 2

|  | Embodiment 2 | Comparative Example 1 | Comparative Example 4 | Comparative Example 5 |
|---|---|---|---|---|
| Brightness | 0.9 | 1.0 | 0.9 | 0.65 |
| Contrast ratio | 12 | 9 | 6 | 11 |

As can be seen from Table 2, in Comparative Example 1, Comparative Example 4 and Comparative Example 5, either the brightness or the contrast ratio is insufficient. In contrast, the display device 200 of Embodiment 2 realizes a display with a sufficient brightness and a high contrast ratio.

Note that while the interface between the light guide 213 and the refractive-index-adjusted layer 231, and the interface between the refractive-index-adjusted layer 231 and the polarizer 224a, are both subjected to an anti-interface-reflection treatment in the present embodiment, the anti-interface-reflection treatment may alternatively be performed only for one of the interfaces. If the interface between the light guide 213 and the refractive-index-adjusted layer 231, and the interface between the refractive-index-adjusted layer 231 and the polarizer 224a, are both subjected to an anti-interface-reflection treatment, as in the present embodiment, it is possible to further improve the contrast ratio.

Moreover, in Embodiments 1 and 2 above, the present invention has been described with respect to a case where the refractive-index-adjusted layer, provided between the light guide and the reflection type display element or between the light guide and the polarizer, functions also as an adhesive layer for attaching the light guide and the reflection type display element to each other or the light guide and the polarizer to each other. Alternatively, the refractive-index-adjusted layer may not function as an adhesive layer. For example, an alternative display device 200' illustrated in FIG. 6 employs a refractive-index-adjusted layer (e.g., a fluorocarbon resin film having a lower refractive index than that of the light guide 213) 231' that does not function as an adhesive layer, wherein the refractive-index-adjusted layer 231' (with the interference films 232a and 232b vapor-deposited on the respective sides thereof) is attached to the light guide 213 and the polarizer 224a via adhesive layers 233a and 233b, which are provided between the light guide 213 and the interference film 232a and between the polarizer 224a and the interference film 232b, respectively. In such a case, it is preferred that the refractive index of the adhesive layer 233a provided between the light guide 213 and the interference film 232a is matched with that of the light guide 213, while the refractive index of the adhesive layer 233b provided between the polarizer 224a and the interference film 232b is matched with that of the polarizer 224a.

Moreover, the structure of the light guide of the illuminator is not limited to those illustrated in Embodiments 1 and 2 above. The light guide may be of any suitable structure as long as it has the function of receiving light from the light source and emitting the received light toward the reflection type display element. Moreover, the material of the light guide is not limited to polymethyl methacrylate or polycarbonate, but may be any of various types of transparent materials, e.g., ARTON manufactured by JSR Corporation or ZEONOR manufactured by ZEON Corporation.

As described above, the present invention can suitably be used with a display device including a frontlight, particularly in cases where a high brightness and a high contrast ratio are desired.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A display device, comprising:
   a light source;
   a light guide having a light-receiving surface for receiving light from the light source and a light-exiting surface for emitting the light, which has entered the light guide through the light-receiving surface;
   a reflection type display element provided on one side of the light guide that is closer to the light-exiting surface; and
   a refractive-index-adjusted layer provided between the light guide and the reflection type display element and having a different refractive index from that of the light guide, wherein:
   the light guide and the reflection type display element are attached to each other via the refractive-index-adjusted layer; and
   at least one of an interface between the light guide and the refractive-index-adjusted layer and an interface between the refractive-index-adjusted layer and the reflection type display element is subjected to an anti-interface-reflection treatment for suppressing a reflection of light at the interface.

2. The display device of claim 1, wherein the anti-interface-reflection treatment is performed by forming an interference film made of a transparent material between the light guide and the refractive-index-adjusted layer and/or between the refractive-index-adjusted layer and the reflection type display element.

3. The display device of claim 1, wherein the interface between the light guide and the refractive-index-adjusted layer and the interface between the refractive-index-adjusted layer and the reflection type display element are both subjected to the anti-interface-reflection treatment.

4. A display device, comprising:
   a light source;
   a light guide having a light-receiving surface for receiving light from the light source and a light-exiting surface for emitting the light, which has entered the light guide through the light-receiving surface;
   a reflection type display element provided on one side of the light guide that is closer to the light-exiting surface;
   a polarizer provided between the light guide and the reflection type display element; and
   a refractive-index-adjusted layer provided between the light guide and the polarizer and having a different refractive index from that of the light guide, wherein:
   the light guide and the polarizer are attached to each other via the refractive-index-adjusted layer; and
   at least one of an interface between the light guide and the refractive-index-adjusted layer and an interface between the refractive-index-adjusted layer and the polarizer is subjected to an anti-interface-reflection treatment for suppressing a reflection of light at the interface.

5. The display device of claim 4, wherein the anti-interface-reflection treatment is performed by forming an interference film made of a transparent material between the light guide and the refractive-index-adjusted layer and/or between the refractive-index-adjusted layer and the polarizer.

6. The display device of claim 4, wherein the interface between the light guide and the refractive-index-adjusted layer and the interface between the refractive-index-adjusted layer and the polarizer are both subjected to the anti-interface-reflection treatment.

7. The display device of claim 1 or 4, wherein the refractive index of the refractive-index-adjusted layer is smaller than that of the light guide.

8. The display device of claim 7, wherein a value of the refractive index of the refractive-index-adjusted layer is greater than 1 and less than or equal to 1.4.

* * * * *